(12) United States Patent
Santhar et al.

(10) Patent No.: US 11,586,510 B2
(45) Date of Patent: Feb. 21, 2023

(54) DYNAMIC CHECKPOINTING IN A DATA PROCESSING SYSTEM

(71) Applicant: INTERNATIONAL BUSINESS MACHINES CORPORATION, Amronk, NY (US)

(72) Inventors: Sathya Santhar, Chennai (IN); Sarbajit K. Rakshit, Kolkata (IN); Balamurugaramanathan Sivaramalingam, Ramanathapuram (IN); Samuel M. Jawaharlal, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 438 days.

(21) Appl. No.: 16/166,006

(22) Filed: Oct. 19, 2018

(65) Prior Publication Data
US 2020/0125458 A1    Apr. 23, 2020

(51) Int. Cl.
*G06F 11/00* (2006.01)
*G06F 11/14* (2006.01)
*G06F 9/48* (2006.01)

(52) U.S. Cl.
CPC ........ *G06F 11/1471* (2013.01); *G06F 9/4881* (2013.01); *G06F 2201/805* (2013.01); *G06F 2201/84* (2013.01)

(58) Field of Classification Search
CPC ............ G06F 11/1471; G06F 11/1458; G06F 11/1461; G06F 9/4881; G06F 2201/805; G06F 2201/84; G06F 9/5038
See application file for complete search history.

(56) References Cited

U.S. PATENT DOCUMENTS

| | | | |
|---|---|---|---|
| 7,392,433 B2 | 6/2008 | Sahoo et al. | |
| 8,127,154 B2 | 2/2012 | Elnozahy | |
| 8,627,143 B2 | 1/2014 | Ranganathan et al. | |
| 9,053,065 B2 | 6/2015 | Garthwaite et al. | |
| 9,304,817 B2 * | 4/2016 | Kim | G06F 9/4881 |
| 9,652,338 B2 | 5/2017 | Bissett et al. | |
| 2007/0220327 A1 | 9/2007 | Ruscio et al. | |
| 2008/0120620 A1 * | 5/2008 | Lett | G06F 9/485 |
| | | | 718/103 |
| 2016/0034362 A1 * | 2/2016 | Al-Wahabi | G06F 11/1407 |
| | | | 714/4.1 |

(Continued)

OTHER PUBLICATIONS

Di, Sheng et al., Optimization of Cloud Task Processing with Checkpoint-Restart Mechanism, 2013, ACM (Year: 2013).*

(Continued)

*Primary Examiner* — Marc Duncan
(74) *Attorney, Agent, or Firm* — Cuenot, Forsythe & Kim, LLC

(57) ABSTRACT

Dynamic checkpointing can include determining, using a processor, a process criticality corresponding to a process configured to execute on computer hardware. The process criticality indicates a priority of the process relative to at least one other process configured to execute on the computer hardware. A checkpoint schedule can be generated, using the processor and based on the process criticality, for checkpointing the process when it executes on the computer hardware.

20 Claims, 10 Drawing Sheets

(56) References Cited

U.S. PATENT DOCUMENTS

2018/0060182 A1* 3/2018 Rao Kotha ............. G06F 9/461

OTHER PUBLICATIONS

Limrungsi, Nakharin et al., Providing Reliability as an Elastic Service in Cloud Computing, 2012, IEEE (Year: 2012).*
Zhao, Juzi et al., Elastic Reliability Optimization Through Peer-to-Peer Checkpointing in Cloud Computing, Feb. 2017, IEEE, vol. 28, No. 2, pp. 491-502 (Year: 2017).*
Cao, Jiajun et al., Checkpointing as a Service in Heterogeneous Cloud Environments, 2015, IEEE, pp. 61-70 (Year: 2015).*
Mell, P. et al., The NIST Definition of Cloud Computing, National Institute of Standards and Technology, U.S. Dept. of Commerce, Special Publication 800-145, Sep. 2011, 7 pg.
"Checkpointing," [online] Apache Ignite © 2015-2017 The Apache Software Foundation [retreived Sep. 11, 2018], retrieved from the Internet: <https://apacheignite.readme.io/docs/checkpointing>, 5 pg.
"About Virtual Machine Checkpoints," [online] Microsoft System Center © 2018 Microsoft [retreived Sep. 11, 2018], retrieved from the Internet: <https://technet.microsoft.com/en-in/library/bb740891.aspx>, 2 pg.
Liu, J. et al., "PFT-CCKP: A Proactive Fault Tolerance Mechanism for Data Center Network," In IEEE 23rd International Symposium on Quality of Service (IWQoS), Jun. 15, 2015, pp. 79-80).

* cited by examiner

DYNAMIC CHECKPOINTING IN A DATA PROCESSING SYSTEM

BACKGROUND

This disclosure relates to the field of data processing, and more particularly, to checkpointing processes executing on a data processor.

Checkpointing a process as it executes on a computer processor entails writing indicia to a file indicating the current state of execution of the process. The result of the operation is to create a checkpoint that contains not only the memory image, but also the resource state of the process—specifically, the particular resources of the computer that are currently assigned to, or "owned" by, the process. If for any reason an unexpected interruption occurs (e.g., deadlock), the checkpoint enables the computer to resume execution of the process at the point at which the last checkpoint was created.

Checkpointing is widely used in data processing systems. Checkpointing is used, for example, in virtual machines, cloud servers, balancing servers, hard disk stores, and other systems that execute data processing functions.

SUMMARY

A method includes determining, using a processor, a process criticality corresponding to a first process. The process criticality indicates a priority for the first process relative to at least a second process configured to execute on computer hardware. The method can include generating a checkpointing schedule, using the processor and based on the process criticality, for checkpointing the first process when the first process executes on the computer hardware.

A system includes a processor programmed to initiate executable operations. The executable operations include determining a process criticality corresponding to a first process configured to execute on computer hardware. The process criticality indicates a priority for the first process relative to at least a second process configured to execute on the computer hardware. The operations can include generating a checkpointing schedule based on the process criticality for checkpointing the first process when the first process executes on the computer hardware.

A computer program product includes a computer readable storage medium on which program code is stored. The program code is executable by a processor to initiate operations. The operations include determining a process criticality corresponding to a first process configured to execute on computer hardware. The process criticality indicates a priority for the first process relative to at least a second process configured to execute on the computer hardware. The operations can include generating a checkpointing schedule, based on the process criticality, for checkpointing the first process when the first process executes on the computer hardware.

DETAILED DESCRIPTION

Figure 1:
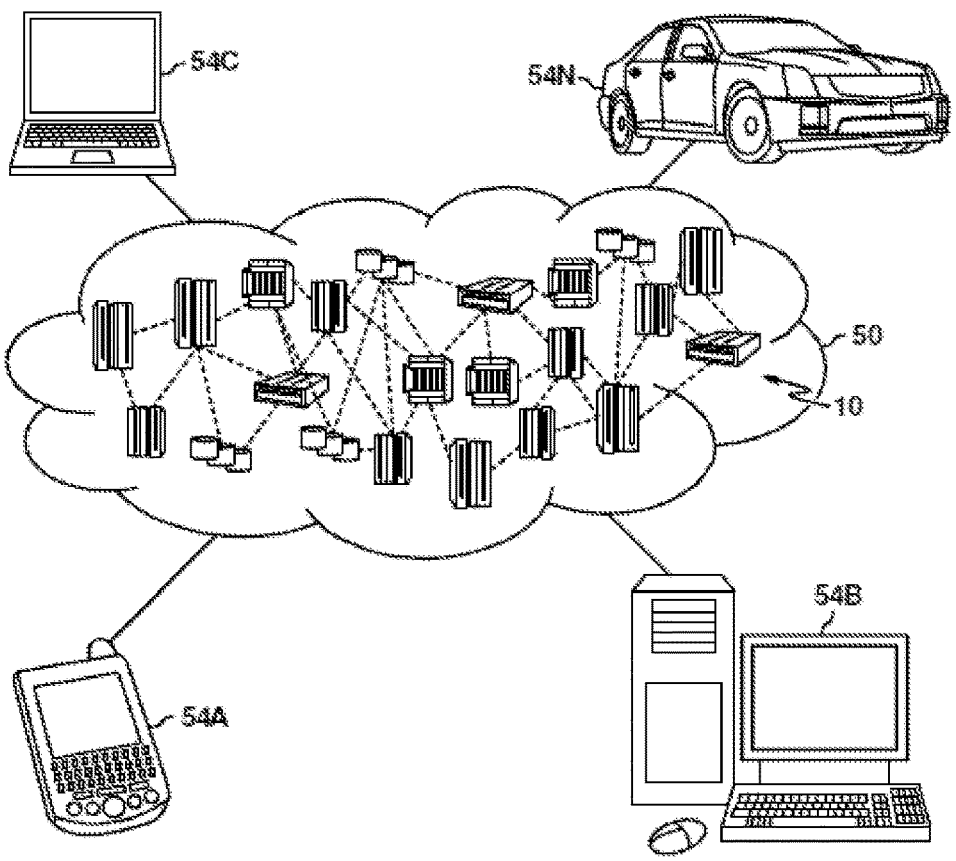
FIG. 1 depicts a cloud computing environment according to an embodiment of the present invention.

The present disclosure pertains to the field of data processing, and more particularly, to methods and systems for checkpointing processes executing on a data processor. Checkpointing is a pervasive feature of computing. With every computer and within every computing environment there is an inevitable risk of "system failure" as operations are executed on a processor. Simply stated, something can go wrong and interrupt execution of a process. Checkpointing serves as a kind of insurance against process interruption.

For example, a computer that interleaves two processes executing on a single processor may encounter deadlock. Deadlock can occur if one of the processes is in a wait state waiting for a shared resource that will not become available because it is held by the other process that is also in the wait state. There are various mechanisms to resolve a deadlock, but recovery typically entails restarting the processes, in which event work done is lost and must be redone. Checkpointing periodically saves data indicating the state of a process at discrete points during execution. The state data can be used when the interrupting condition is resolved so that the process needs only to be rolled back to the last checkpoint before execution resumes.

In general, the more frequent the checkpointing, the greater the insurance. But the insurance comes at a cost, namely the time lost when resources needed for executing a process are allocated to writing processing state data to a file. Although, the time lost executing a single checkpoint may be minimal, in the aggregate, over multiple processes or multiple users, the time can be significant. Indeed, the trade-off serves to emphasize the fact that computing resources are a scarce commodity in that usage demand often exceeds resource availability. All users—from a single user executing multiple programs on a single-processor computer to multiple users vying for access to a shared pool of computing resources—confront this trade-off.

The embodiments described in this disclosure specifically address the trade-off by improving the operative efficiency of data processors and data processing systems that utilize checkpointing when executing multiple processes. (A process waiting to execute or currently executing on a processor is also referred to herein as a "job.")

Operative efficiency is enhanced by varying the frequency with which a machine or multi-machine system checkpoints each job based on the process criticality of the job relative to other jobs. By varying the checkpointing frequency, a machine's resources are allocated so that jobs that are more critical than others are afforded greater ownership of resources. If less critical jobs are checkpointed less frequently, the machine's resources (e.g., processor, memory, input/output (I/O) resources) can be used more intensively by more critical jobs. On net, the result is a faster running machine. More generally, the resulting re-allocation of machine resources makes for a more efficient machine.

In describing various arrangements, the following definitions apply throughout this disclosure.

As defined herein, "state" refers to the data processing resources allocated, or owned, by a process at a given instant during execution of the process on a processor.

As defined herein, "checkpoint" is an operation that saves data indicating the current state of execution of a process to a file, and "checkpointing" means executing the operation with a processor.

As defined herein, "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "data processing system," "computer," and "machine" are used interchangeably to refer to one or more hardware systems configured to process data, each hardware system including at least one processor programmed to initiate executable operations and memory.

As defined herein, the term "server" means a data processing system configured to share services with one or more other data processing systems.

As defined herein, "computer readable storage medium" means a storage medium that contains or stores program code for use by or in connection with an instruction execution system, apparatus, or device. Additionally, as defined herein, a "computer readable storage medium" is not a transitory, propagating signal per se.

As defined herein, the term "internal event" refers to an event occurring within a computer or machine or data processing system during the execution of a process running on a processor of the computer, machine, or data processing system. Such events include, for example, I/O cycles, database (DB) connections, saves to random-access memory (RAM) and hard-disk stores, and other internal processor operations, as well as interruptions such as deadlock or other processing faults.

As defined herein, the term "external event" refers to an event that occurs apart from the computer, machine, or data processing system in which a process executes or "runs," but nonetheless affects the importance or criticality of the process relative to at least one other process. An example is an event such as a governmental investigation of a business that necessitates the urgent filing of a responsive report by the business, thereby unexpectedly making a computer-executable process for generating the report more critical relative to a process for generating the business's quarterly financial statements.

As defined herein "responsive to" means responding or reacting to an action or event. Thus, if a second action is performed "responsive to" a first action, there is a causal relationship between an occurrence of the first action and an occurrence of the second action, and the term "responsive to" indicates such causal relationship.

As defined herein, the term "automatically" means without user intervention.

As defined herein, the term "user" means a person (i.e., a human being). The terms "employee" and "agent" are used herein interchangeably with the term "user".

As defined herein, "criticality" means any indication of the importance of a process, or job, executing or awaiting execution on a processor relative to other jobs also executing or awaiting execution on the same or a different processor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
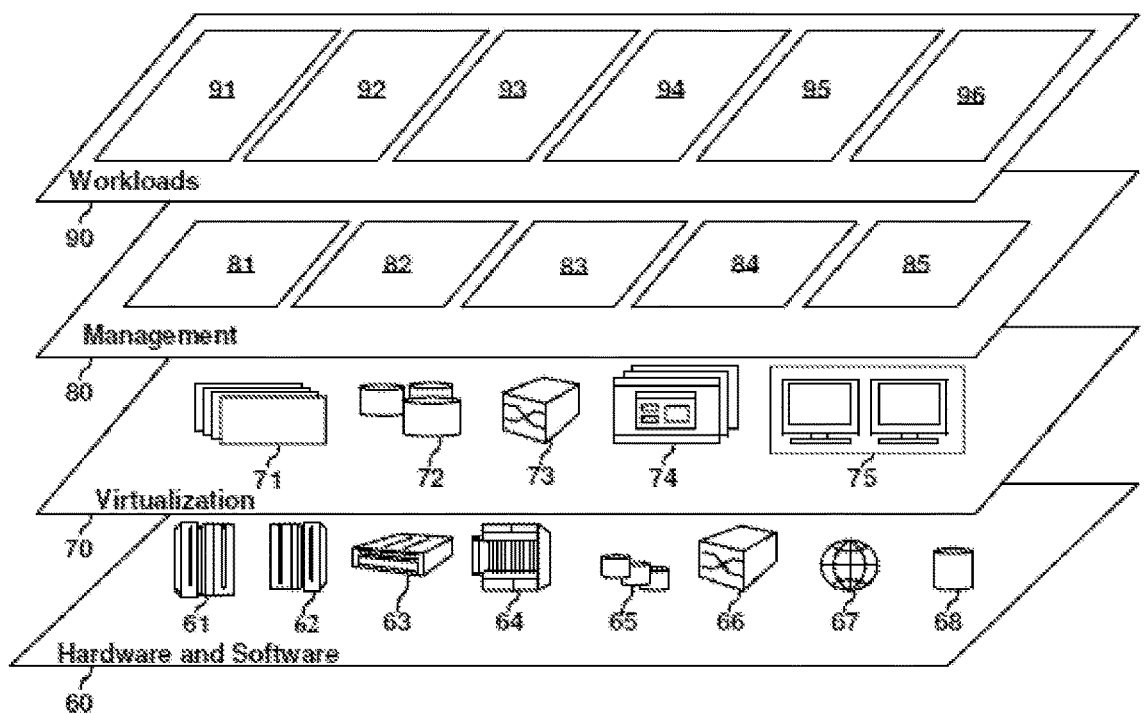
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system 96 for dynamic checkpointing as described herein.

System 96 is capable of dynamically setting different checkpoints for different computer executable processes. System 96 can be implemented on a computer processor as described herein in connection with the example of FIG. 3. The processor can be an element in any of various types of computing nodes.

Figure 3:
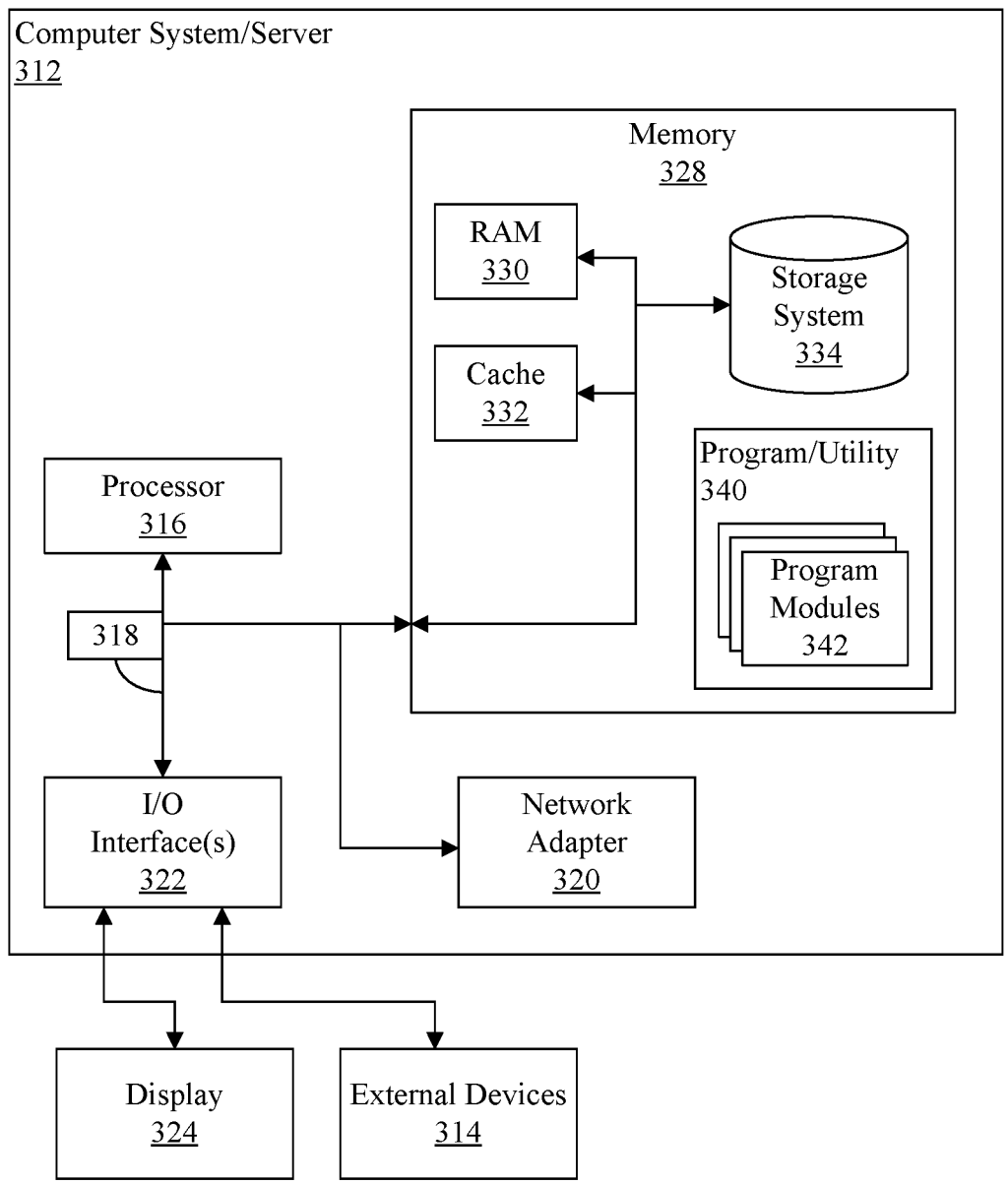
FIG. 3 depicts a cloud computing node according to an embodiment of the present invention.

Referring to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer system/server 312, which is operational with numerous other general-purpose or special-purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

Memory 328 can include computer system readable media in the form of volatile memory, such as RAM 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include dynamic checkpointing system 96 or portions thereof. Program/utility 340 is executable by processing unit 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
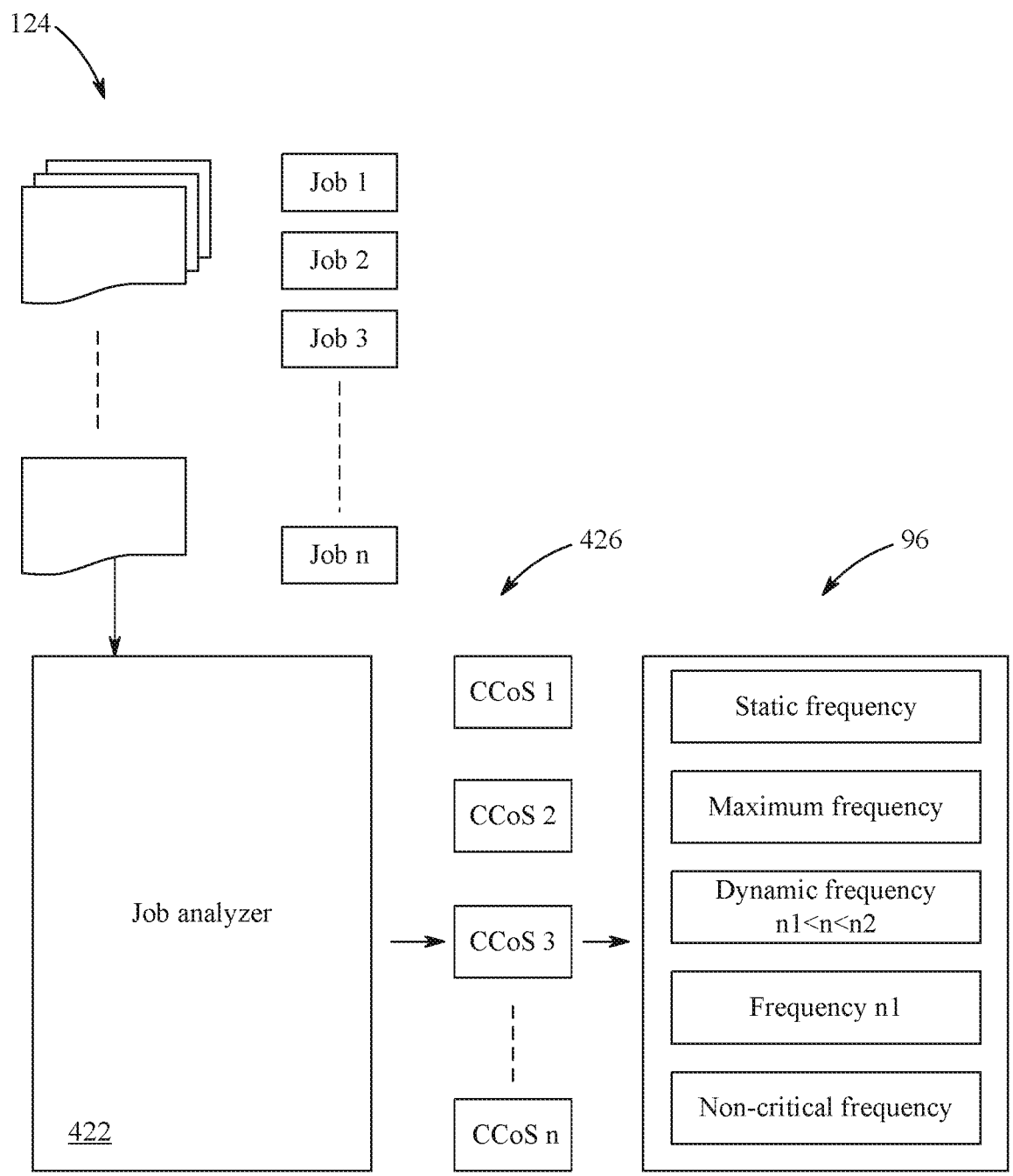
FIG. 4 depicts a system for determining process criticality and generating a checkpointing schedule according to an embodiment of the present invention.

FIG. 4 depicts one embodiment of system 96 for dynamically setting different checkpoints for multiple computer-executable processes executing or waiting to execute on the processor of cloud-based computing node or other of the type computing node illustrated in FIG. 3. System 96 varies the frequency with which each of the processes are checkpointed depending on the nature the process and the importance of the process relative to the other processes.

System 96 includes job analyzer 422 that determines a process criticality corresponding to each of the multiple computer-executable processes. Process criticality indicates the priority of a process relative to at least one other computer-executable process. Responsive to determining the process criticality, job analyzer 422, executing on a processor generates a schedule for checkpointing the process when the process executes on the same or a different processor. That is, the schedule determines the frequency with which a process is checkpointed—or more particularly, when, during execution of the process on a processor, data indicating the state of the process is written to a file.

It is important to note that process criticality does not merely depend on the process itself or even the computing resources of the processor on which it executes. Rather, the criticality of the process is one of relative priority, that is, importance relative to other computer-executable processes vying for ownership of the processing resources.

This aspect is illustrated in FIG. 4 where multiple computer-executable processes are represented as jobs (labeled in the figure as Job 1, Job 2, Job 3, . . . , Job n) in a job queue. Based in part on job-specific data 424 (e.g., I/O cycles, DB connections, saves to RAM and hard-disk stores, internal processor operations), job analyzer 422 determines each job's criticality—that is, each job's priority, as specified by a job owner, relative to the other jobs. Responsive to determining the process criticality of the job, job analyzer 422 generates a schedule for checkpointing the process when the process executes on the same or a different processor.

Job analyzer 422 can set a single, albeit different, frequency for each job. For example, the job analyzer 422 can set the checkpointing frequency for job 1 to 40 ms, 30 ms for job 2, and 20 ms for job 3. The frequencies correspond to the relative importance of each job. In this example job 3 is the more critical and thus job 3's data is backed up more frequently. With less frequent checkpointing, job 1 is at greater risk than job 2, and both are at greater risk than job 1, that data will be lost if deadlock or other interruption occurs during job processing. The result, however, is the machine runs faster than if all three were checkpointed at 20 ms. Moreover, by varying checkpointing frequencies based on the relative criticality of each job, the machine operates more efficiently. Processing time that would otherwise have been allocated to less critical jobs is instead allocated to the more critical job.

In one embodiment, system 96 presents a menu of checkpointing classes of service (CCsoS) from which a job owner (i.e., the machine or system user who causes the job to execute) can select a specific checkpointing class of service (CCoS). Each CCoS can correspond to a different checkpointing frequency. Each schedule generated by job analyzer 422 can correspond to a specific CCoS. Each CCoS can be saved to a file 426 and made available to an operating system running on the processor that executes the job. This is illustrated in FIG. 4. The CCoS for job 1 is a predetermined static frequency of checkpointing. Job 2 is deemed the most critical of the jobs and is therefore assigned the highest frequency (e.g., most frequent data backups). For job 3, the frequency can vary within a predetermined range of frequencies. For job n, deemed to be less important than the other jobs, the non-critical CCoS is assigned and so, as the job executes, saves of state data occur with the lowest frequency.

Checkpointing can occur with different frequencies for different jobs having different process criticalities, but the frequency corresponding to each job can remain constant throughout execution of the job on a process. In another arrangement, however, the frequency is not uniform, but is different for different internal operations performed as the job executes.

In generating a job's checkpointing schedule on an operation-by-operation basis, job analyzer 422 initially identifies the number of operations that must be executed by the processor in completing the job. For example, the job analyzer 422 can factor in the number of I/O cycles, the number of saves to a RAM or a hard-disk, and internal processor operations. Depending on the specific computing environment in which the system 96 is operating, other factors can be considered by the job analyzer 422. For example, if a job involves a database server serving a client, whether on the same machine or not, the job analyzer 422 can factor in the number of DB connections required by the job. Job analyzer 422 can determine a checkpoint for each operation individually.

Figure 5:
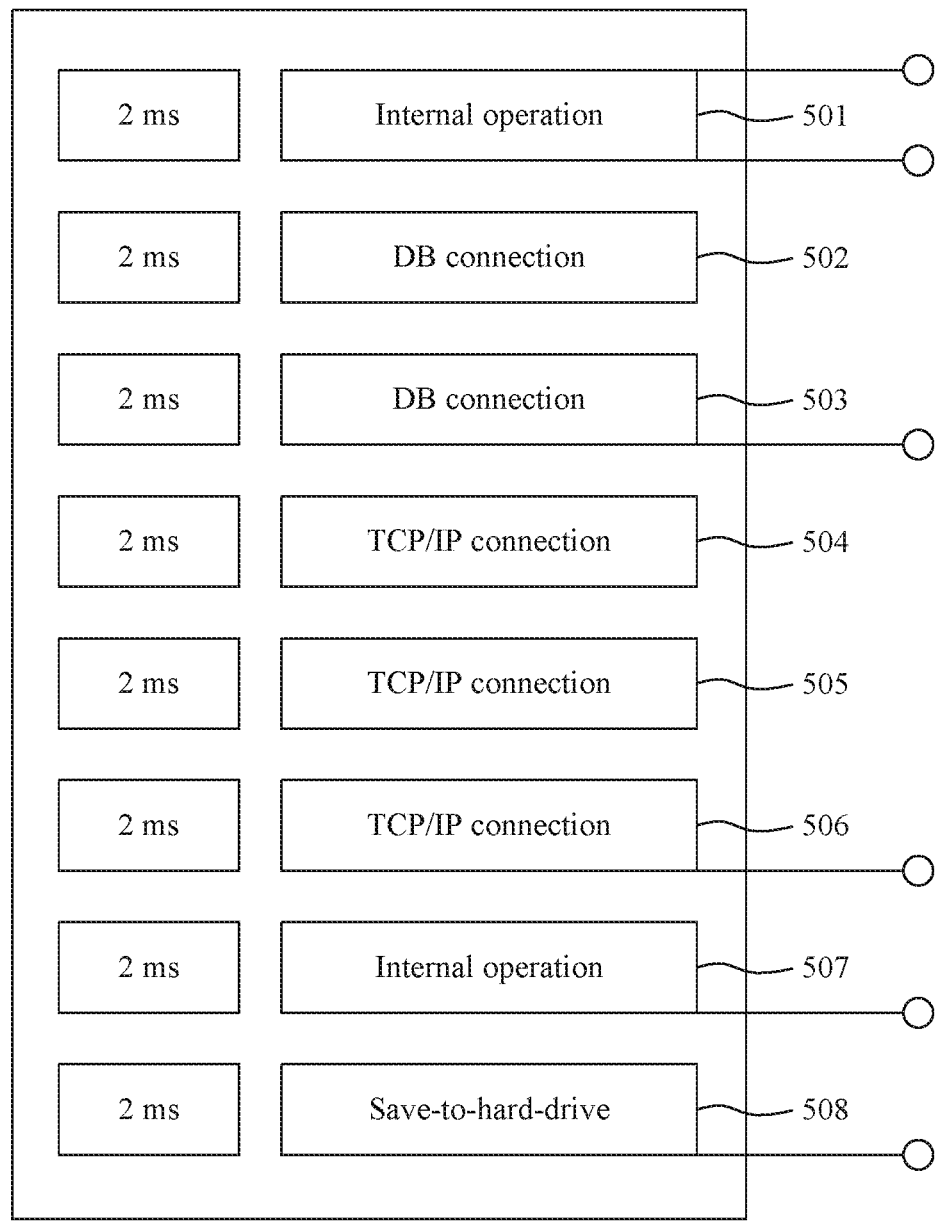
FIG. 5 depicts an executing process checkpointed during processor execution according to an embodiment of the present invention.

FIG. 5 illustrates checkpointing a process during execution according to a schedule generated by job analyzer 422. After an initial checkpoint, a data processing system performs a generic internal operation 501 and within 2 ms executes another checkpoint. The data processing system performs a third checkpoint 4 ms later following execution of two DB connections 502, 503. The next checkpoint is not executed by the data processing system until 6 ms later following three TCP/IP connections 504, 505, 506 (no checkpoint is necessary, for example, as there is nothing to save to the state file). The data processing system executes the next checkpoint 2 ms later, following execution of another internal operation 507. The data processing system executes another checkpoint 2 ms later following a save-to-hard-drive operation 508. As illustrated checkpointing frequency as performed by the data processing system varies depending on the specific operation performed.

A user running multiple jobs can set a unique CCoS for each based on the relative priority of each job as determined by the user. The CCoS can reflect the importance of the job relative to other jobs, the sensitivity of the data used or generated by the job, the cost of job execution, the time duration of job execution, and a host of other considerations that can be factored in to determine the job's criticality relative to other jobs. Jobs having a higher criticality are checkpointed more frequently to mitigate the risk that data generated by the jobs is lost due to an interruption or system failure. Although less critical jobs face greater risk from less frequent checkpointing, the machine runs more efficiently because processing resources are allocated in accordance with the user's determination of job priorities. By setting a unique CCoS for each of the multiple jobs, the machine's resources are used more intensively by more critical jobs.

Figure 6:
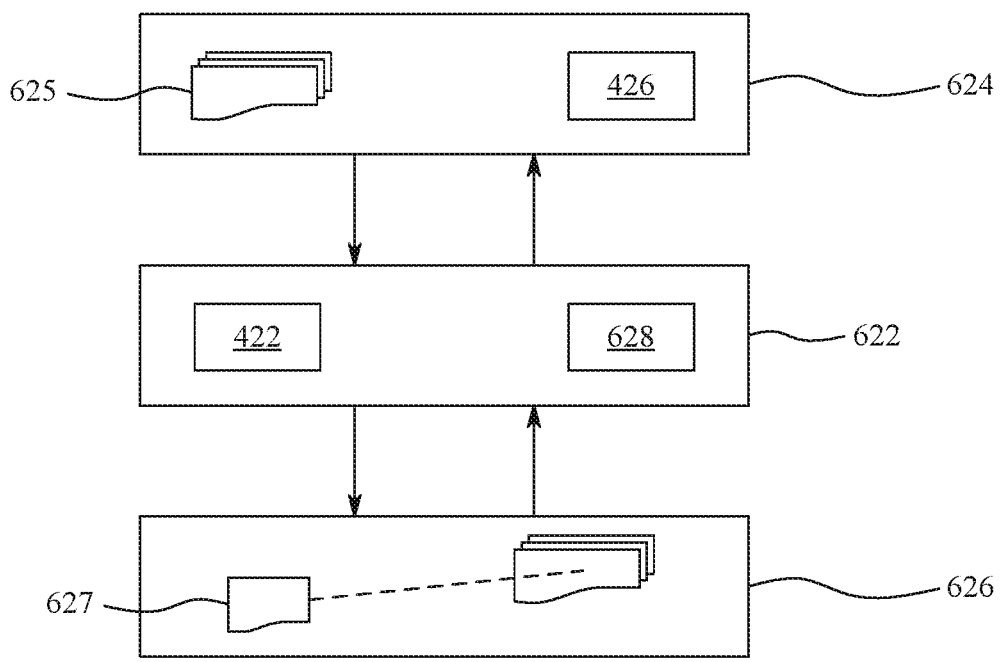
FIG. 6 depicts a computing environment for implementing a system for determining process criticality and generating a checkpointing schedule according to an embodiment of the present invention.

FIG. 6 is a block diagram depicting an implementation of system 96 in a single computer 620. Illustratively, computer 620 comprises processor 622, memory 624, and I/O unit 626. Multiple Jobs with corresponding job data 625, 627 can be stored in the memory 624 and/or received via the I/O unit 626. Each job is a computer-executable process, such as process 628 explicitly shown in the figure. Job analyzer 422, can be implemented in computer-executable code configured to execute on the processor 622. When executed on processor 622, job analyzer 422, determines a process criticality corresponding to computer-executable process 628, the process criticality indicating a priority of the process relative to at least one other process, or job, in the job queue or yet to be queued for processing. Job analyzer 422 determines the process criticality based on a CCoS selected by a process owner or data otherwise provided by the process owner indicating the relative priority of the process. Responsive to determining the process criticality, job analyzer 422 generates a checkpointing schedule for checkpointing process 628. Job analyzer 422 can save the checkpointing schedule to the file 426, which can be stored in the memory 624. As the process 628 executes on the processor 622, the checkpointing operations can be performed by an operating system (not explicitly shown) in accordance with the checkpointing schedule saved as file 426.

A user running multiple jobs can set a unique CCoS for each based on the relative priority of each job as determined by the user. The CCoS can reflect the importance of the job relative to other jobs, the sensitivity of the data used or generated by the job, the cost of job execution, the time duration of job execution, and a host of other considerations that can be factored in to determine the job's criticality relative to other jobs. Job having a higher criticality are checkpointed more frequently to mitigate the risk that data generated by the jobs is lost due to an interruption or system failure. Although less critical jobs face greater risk from less frequent checkpointing, the machine runs more efficiently because processing resources are allocated in accordance with the user's determination of job priorities. By setting a unique CCoS for each of the multiple jobs, the machine's resources are used more intensively by more critical jobs.

Illustratively in FIG. 6, job analyzer 422 and executing process 628 run on the same processor 622 of the same computer 620. In another arrangement, however, job analyzer 422 executes on a processor separate from the one on which process 628 executes. For example, the analyzer 422 can execute on one processor of a multi-processor computer and process 628 can execute on another processor. In still another arrangement, job analyzer 422 and process 628 can execute on the different processors of different computers or machines or different data processing systems. This arrangement is illustrated in FIG. 7.

Figure 7:
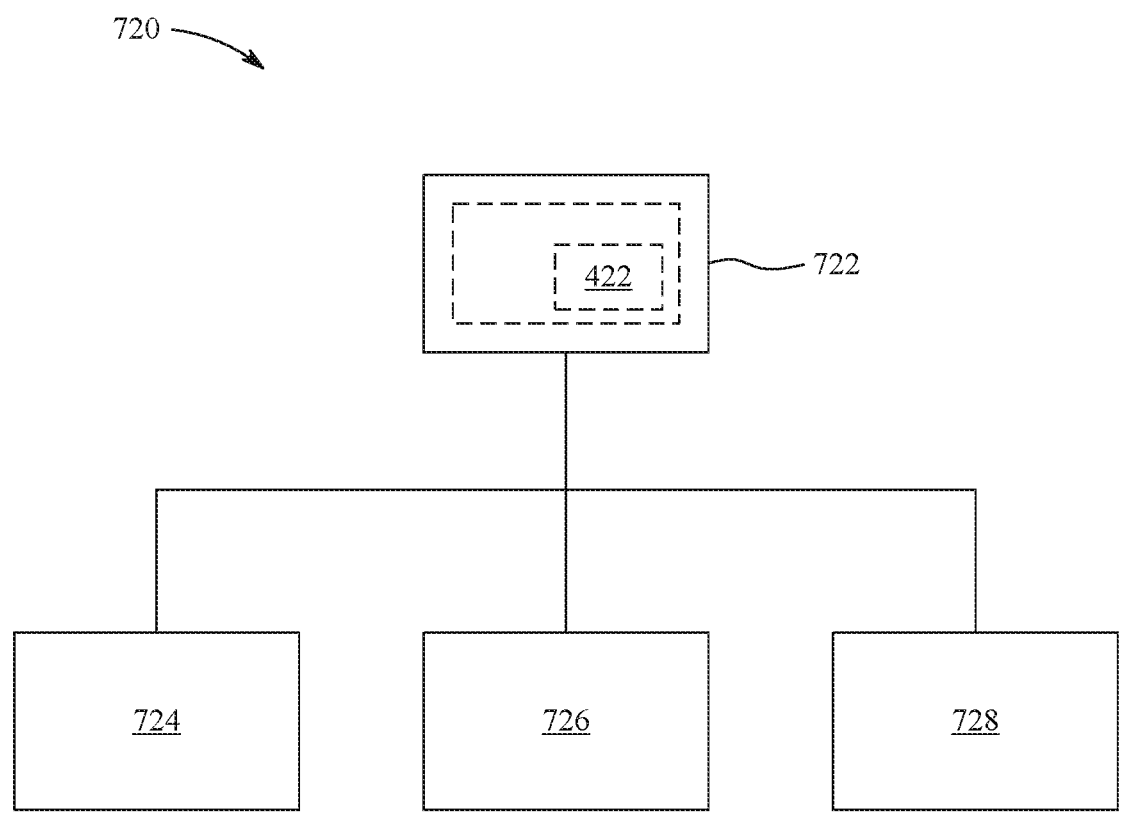
FIG. 7 depicts a computing environment for implementing a system for determining process criticality and generating a checkpointing schedule according to an embodiment of the present invention.

FIG. 7 is a block diagram of a multi-computer system 720 comprising a server 722 and computers 724, 726, and 728 communicatively linked to the server according to a centralized data processing architecture or a distributed data processing arrangement. Job analyzer 422 can be implemented as computer-executable code configured to run on server 722. Executing on a processor of server 722, job analyzer 422 determines the process criticality of a computer-executable process that will run on one of the three computers 724, 726, 728. The process criticality indicates the priority of the process relative to one or more other processes configured to execute on a processor of one the three computers 724, 726, 728.

The arrangement illustrated in FIG. 7 can include a service-delivery arrangement for providing on-demand network access to a shared pool of configurable computing resources, such as network access, network bandwidth, servers, processing, memory, storage applications, virtual machines (VMs), and the like. A cloud computing environment is an example arrangement. In such an environment, a service provider can provide a user access to applications running on a cloud infrastructure. The service provider, in such an environment, can provide the user an ability to deploy onto the cloud infrastructure user-created or acquired applications created using programming languages and tools supported by the service provider. The service provider can enable the user to provision processing, storage, networks, and other fundamental computing resources with which the user is able to deploy and run arbitrary software that can include operating systems and applications.

System 96 for setting checkpoints for multiple computer-executable processes executing or waiting to execute on a processor can be deployed in and provide an enhancement to any service-delivery arrangement. In a service-delivery arrangement, the service provider can provide a set of checkpointing classes of service (CCsoS) that a user can select from, each CCoS having an associated Product Billing Indicator (PBI) defined by the service provider. In a specific arrangement, for example, the user-selected CCoS would be set along with the job and would determine the frequency with which data generated by an executing process is cached directly via an I/O unit or to the memory space of a VM, for example, or the like. A user presented with a menu from which to select a CCoS can choose a CCoS that assigns a single checkpointing frequency for the entire job or a CCoS that assigns different frequencies for different operations within the job (see FIG. 5). Depending on the CCoS selected, job analyzer 422 generates the checkpointing schedule based on the selected CCoS.

Figure 8:
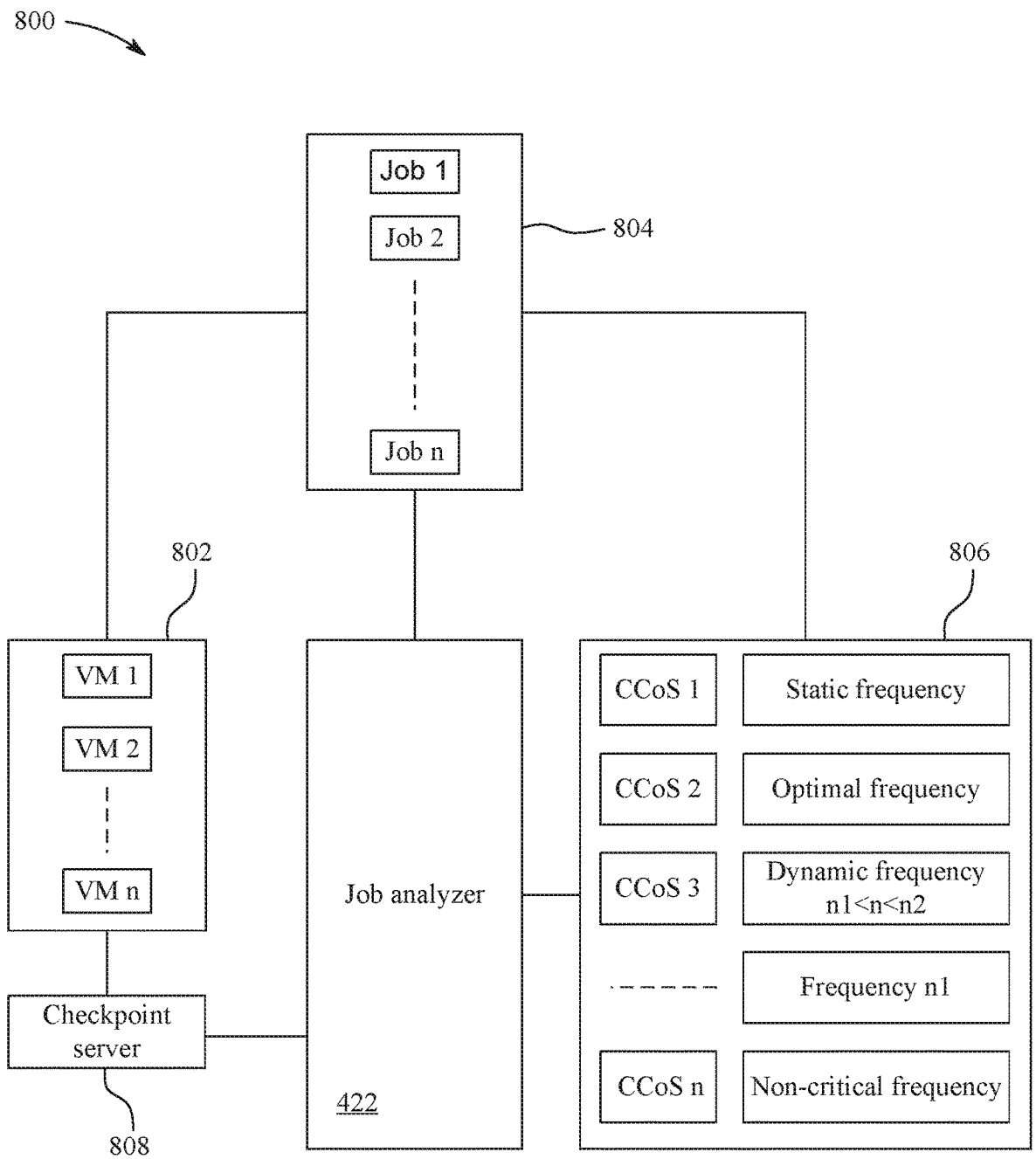
FIG. 8 depicts a system for determining process criticality and generating a checkpointing schedule based on the process criticality according to an embodiment of the present invention.

FIG. 8 illustrates an arrangement for setting checkpoints for multiple computer-executable processes in a service delivery environment 800 that includes multiple virtual machines (VMs) 802. Illustratively, the computer-executable processes are represented as n jobs arranged in a queue 804 for processing on the VMs 802. The job analyzer 422 determines for each job a process criticality indicating priority of the job relative to the other processes (i.e., jobs in the job queue 804 or waiting to be queued). The process criticality of each job corresponds to a user-selected CCoS selected from a set of CCsoS 806. Optionally, the checkpointing schedules generated by the job analyzer 422 can be loaded to a checkpoint server 808 and used to checkpoint each job as that job runs on one of the VMs 802.

In the service-delivery environment 800, CCsoS facilitate the efficient allocation of computing resources. Specifically, the service provider can price the CCsoS based on factors such as cost of processing, time needed to complete processing, and overall demand among users. Because intensity, and thus the cost, of use of system resources varies with demand, system 96 can establish the prices responsive to current demand. Those users who desire protection for processing jobs they deem more critical will be willing to pay more. Those users wishing to pay less can opt for less frequent checkpointing. The net result is that computing resources are allocated to users in accordance with users' preferences.

As already described, the CCoS can be based on factors such as job importance and data sensitivity, as well as internal events such as cost of job execution, time duration for job completion, and the like. In another arrangement, however, the CCoS can be based on external events. For example, a process used by a business to generate fiscal year-end financial statements can be more critical relative to other processes in the months, weeks, or days before the statements must be filed. The criticality of year-end filings can induce the user to choose a different CCoS that reflects the criticality of a process for generating year-end filings. Consistent with this need, the service provider in one arrangement can provide the user the option of pre-designating a change in CCoS based on an anticipated event like a year-end financial statement filing that makes the process more critical relative to other business processes at a specific time of year.

Other events, however, may not occur with similar regularity or predictability. Instead, unanticipated external events can cause a change in the criticality of a specific process. For example, a business can confront an unanticipated change in governmental regulations or an unexpected governmental investigation that heightens the criticality of a process upon which the business relies for generating a responsive report. Another example is a business, such as an airline, that faces a sudden surge in demand, making the airline's computer-based ticketing processes unexpectedly more critical relative to other processes.

Figure 9:
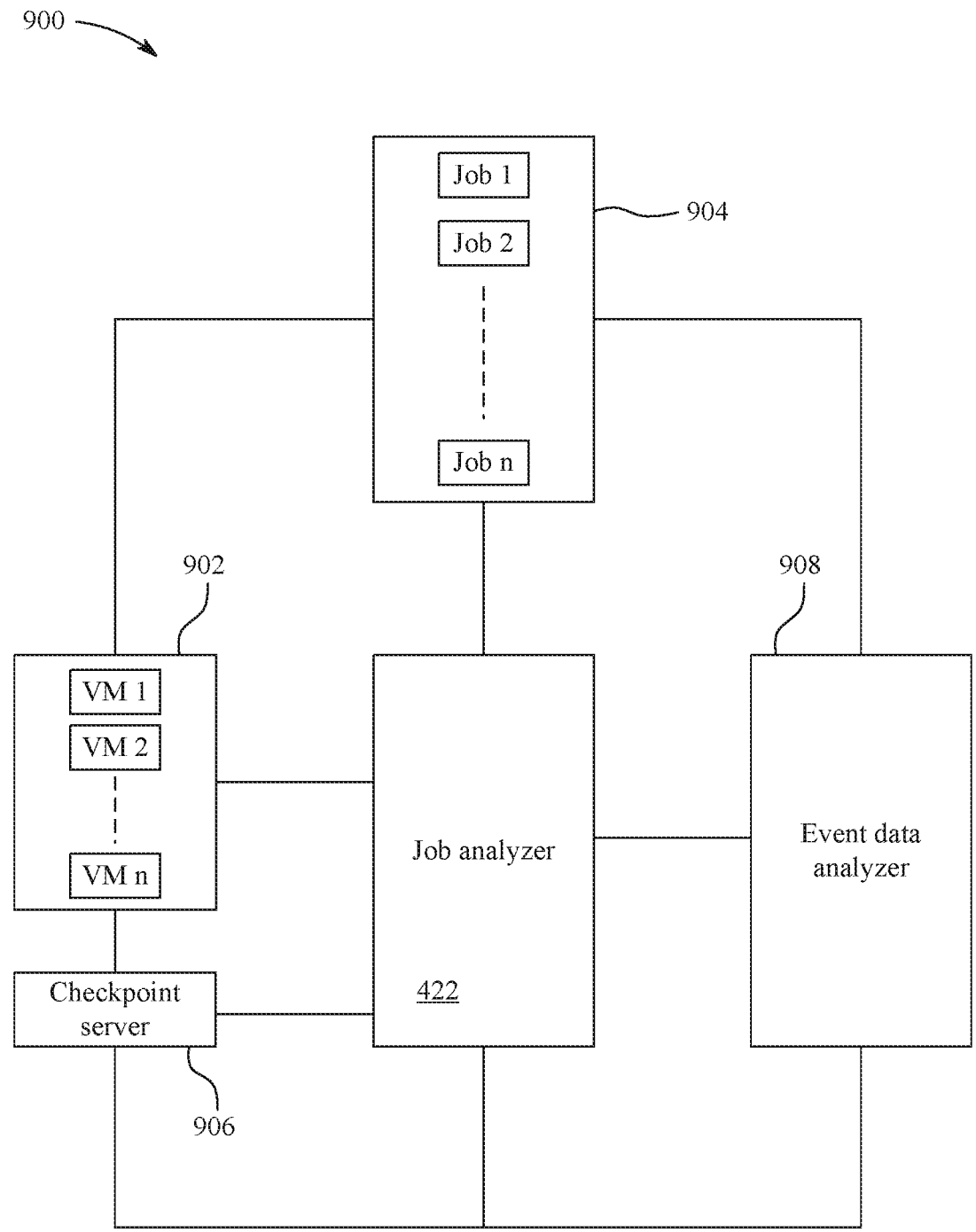
FIG. 9 depicts a system for determining process criticality and generating a checkpointing schedule based on the process criticality according to an embodiment of the present invention.

FIG. 9 illustrates a system 900 according to another inventive arrangement that includes a capability for predicting events that affect process criticality. The system 900 dynamically changes CCsoS automatically in response to external events affecting the criticality of processes. The system 900 illustratively includes job analyzer 422 that, executing on a processor, determines a process criticality for each of a plurality of processes (jobs 1, 2, . . . , n) 904 configured to execute on one of a plurality of virtual machines (VM 1, VM 2, . . . , VM n) 902, and responsive to determining the process criticality (which again indicates the relative priority of each process relative to the others), generates a checkpointing schedule for each of the processes. Each process criticality can correspond to a designated CCoS saved to a checkpoint server 906 and used in checkpointing each job as the job runs on one of the VMs 902. In addition, the system includes an event data analyzer 908, which predicts criticality based on data analysis of events that affect each process's criticality and is used by the job analyzer 422 to automatically generate checkpointing schedules for each job. The system 900 with this capability can be used by an individual user or organization using an internal computer system or by a service provider providing pooled computing resources to multiple users.

The predictions of the event data analyzer 908 can be based, at least in part, on specifications supplied to the event data analyzer by a user regarding the nature of the processes that the user intends to run. In view of the specifications, the event data analyzer 908 can analyze unstructured information culled from multiples sources, including social media, news reporting, government announcements, and the like, and can automatically set the CCoS for a process in advance of an event expected to occur that would change the criticality of the process relative to other processes. The event data analyzer, in one arrangement, can employ artificial intelligence (AI) provided by an AI system configured to learn what events affect the criticality of the processes specified by a user. One such AI system is the Watson™ system that is available from the International Business Machines (IBM) Corporation of Armonk, N.Y. The Watson™ system is an application of advanced natural language processing, information retrieval, knowledge representation and reasoning, and machine learning technologies to the field of open domain question answering.

Figure 10:
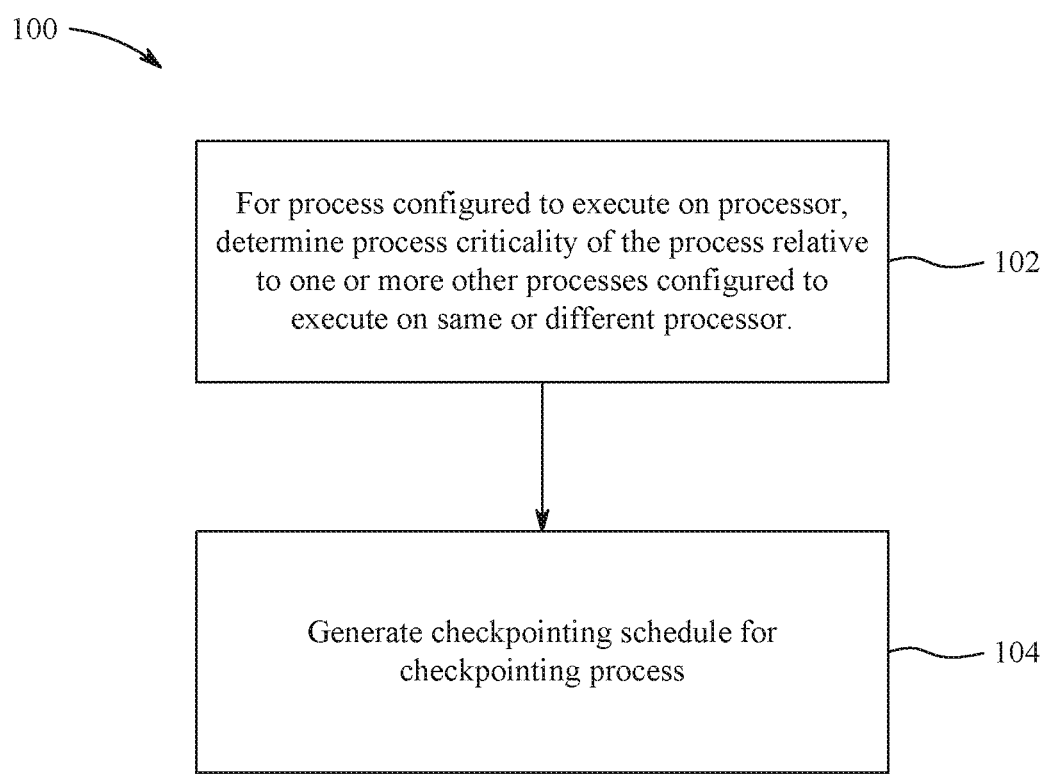
FIG. 10 is a flowchart illustrating a method of determining process criticality and generating a checkpointing schedule according to an embodiment of the present invention.

FIG. 10 illustrates a method 100 for determining a process criticality and, based on the process criticality, generating a checkpointing schedule. Specifically, method 100 includes, at 102, determining a process criticality corresponding to a first process configured to execute on a processor. The process criticality indicates a priority of the first process relative to at least a second process configured to execute on the same or a different processor.

Method 100 includes generating at 104, responsive to determining the process criticality of the first process, a checkpointing schedule for checkpointing the first process when it executes on the same or a different processor.

The schedule generated at 104, according to one arrangement, can comprise at least a first and a second checkpointing frequency, the first checkpointing frequency corresponding to an operation executed when processing the first process and the second checkpointing frequency corresponding to a different operation executed when processing the first process.

Figure 11:
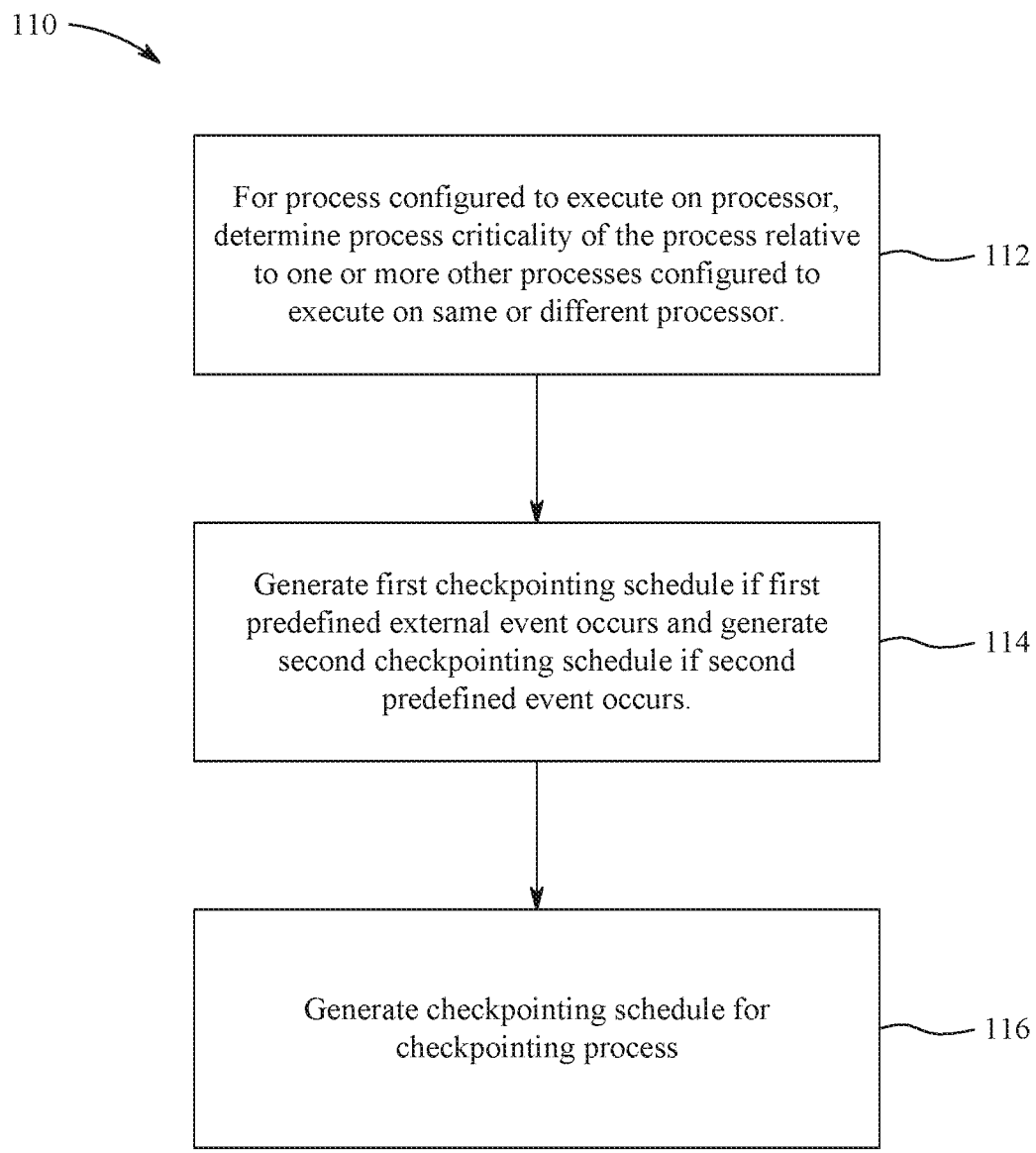
FIG. 11 is a flowchart illustrating a method of determining process criticality and generating a checkpointing schedule according to an embodiment of the present invention.

FIG. 11 illustrates a method 110 for generating a checkpointing schedule based on process criticality according to another arrangement. Method 110 includes at 112 determining a process criticality corresponding to a first process configured to execute on a processor, the process criticality indicating a priority of the first process relative to at least a second process configured to execute on the same or a different processor. At 114, method 110 includes generating a first checkpointing schedule if a first predefined external event occurs and generating a second checkpointing schedule if a second predefined external event occurs. Method 110 further includes automatically determining when the first event occurs, and responsive thereto, generating the first checkpointing schedule at 116.

With respect to both method 100 and method 110, the checkpointing schedule, according to still another arrangement, can correspond to a user-selected CCoS. In yet another arrangement, the selected CCoS can be selected from a plurality of checkpoint classes of service provided by a service provider. According to another arrangement, if the selected CCoS is selected from a plurality of checkpoint classes of service provided by a service provider, the CCoS can automatically change if a predesignated external event occurs.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
    determining, using a processor, a process criticality corresponding to a first process, the process criticality indicating a priority for the first process relative to at least a second process configured to execute on computer hardware;
    identifying a number of operations executed by the processor for completing the first process;
    generating a checkpointing schedule, using the processor, based on the process criticality and the number of execution operations executed by the processor for completing the first process, for checkpointing the first process when the first process executes on the computer hardware, wherein the checkpointing schedule generated corresponds to a user-selected checkpointing class of service that assigns different checkpoint frequencies to the first process and the second process, wherein the checkpointing schedule generated comprises at least a first and a second checkpointing frequency, the first checkpointing frequency corresponding to an operation executed when executing the first process and the second checkpointing frequency corresponding to a different operation executed when executing the first process; and
    implementing the checkpointing the first process according to the checkpointing schedule.

2. The method of claim 1, wherein the generating the checkpointing schedule comprises generating a first checkpointing schedule in response to a first predefined external event and generating a second checkpointing schedule in response to a second predefined external event.

3. The method of claim 1, wherein the selected checkpointing class of service is selected from a plurality of checkpoint classes of service.

4. The method of claim 3, further comprising automatically changing the checkpointing class of service responsive to a predesignated external event occurring.

5. The method of claim 1, wherein the number of execution operations executed by the processor for completing the first process comprises a number of input/output cycles.

6. The method of claim 1, wherein the number of execution operations executed by the processor for completing the first process comprises a number of saves to memory.

7. The method of claim 1, wherein the number of execution operations executed by the processor for completing the first process comprises a number of database connections required for the first process.

8. A system, comprising:
    a processor programmed to initiate executable operations, the operations including:
        determining a process criticality corresponding to a first process configured to execute on computer hardware, the process criticality indicating a priority for the first process relative to at least a second process configured to execute on the computer hardware;
        identifying a number of operations executed by the processor for completing the first process;
        generating a checkpointing schedule, based on the process criticality and the number of execution operations executed by the processor for completing the first process, for checkpointing the first process when the first process executes on the computer hardware, wherein the checkpointing schedule generated corresponds to a user-selected checkpointing class of service that assigns different checkpoint frequencies to the first process and the second process, wherein the checkpointing schedule generated comprises at least a first and a second checkpointing frequency, the first checkpointing frequency corresponding to an operation executed when executing the first process and the second checkpointing frequency corresponding to a different operation executed when executing the first process; and
        implementing the checkpointing the first process according to the checkpointing schedule.

9. The system of claim 8, wherein generating the checkpointing schedule comprises generating a first checkpointing schedule if a first predefined external event occurs and generating a second checkpointing schedule if a second predefined external event occurs.

10. The system of claim 8, wherein the selected checkpointing class of service is selected from a plurality of checkpointing classes of service.

11. The system of claim 10, the operations further comprising automatically changing the checkpointing class of service responsive to a predesignated external event occurring.

12. The system of claim 8, wherein the number of execution operations executed by the processor for completing the first process comprises a number of input/output cycles.

13. The system of claim 8, wherein the number of execution operations executed by the processor for completing the first process comprises a number of saves to memory.

14. The system of claim 8, wherein the number of execution operations executed by the processor for completing the first process comprises a number of database connections required for the first process.

15. A computer program product, comprising a computer readable storage medium having program code stored thereon, the program code executable by a processor to initiate operations comprising:

determining a process criticality corresponding to a first process configured to execute on computer hardware, the process criticality indicating a priority for the first process relative to at least a second process configured to execute on the computer hardware;

identifying a number of operations executed by the processor for completing the first process;

generating a checkpointing schedule, based on the process criticality and the number of execution operations executed by the processor for completing the first process, for checkpointing the first process when the first process executes on the computer hardware, wherein the checkpointing schedule generated corresponds to a user-selected checkpointing class of service that assigns different checkpoint frequencies to the first process and the second process, wherein the checkpointing schedule generated comprises at least a first and a second checkpointing frequency, the first checkpointing frequency corresponding to an operation executed when executing the first process and the second checkpointing frequency corresponding to a different operation executed when executing the first process; and implementing the checkpointing the first process according to the checkpointing schedule.

16. The computer program product of claim 15, wherein generating the checkpointing schedule comprises generating a first checkpointing schedule if a first predefined external event occurs and generating a second checkpointing schedule if a second predefined external event occurs.

17. The computer program product of claim 16, the operations further comprising automatically determining when the first external event occurs.

18. The computer program product of claim 15, wherein the number of execution operations executed by the processor for completing the first process comprises a number of input/output cycles.

19. The computer program product of claim 15, wherein the number of execution operations executed by the processor for completing the first process comprises a number of saves to memory.

20. The computer program product of claim 15, wherein the number of execution operations executed by the processor for completing the first process comprises a number of database connections required for the first process.

* * * * *